(12) United States Patent
Singh et al.

(10) Patent No.: US 12,219,582 B2
(45) Date of Patent: Feb. 4, 2025

(54) NETWORK-BASED CELL ASSIGNMENT FOR CARRIER AGGREGATION SYSTEMS AND METHODS

(71) Applicant: T-Mobile USA, Inc., Bellevue, WA (US)

(72) Inventors: Jasinder Singh, Olathe, KS (US); Nishant Patel, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 425 days.

(21) Appl. No.: 17/555,017

(22) Filed: Dec. 17, 2021

(65) Prior Publication Data
US 2023/0199810 A1 Jun. 22, 2023

(51) Int. Cl.
| | |
|---|---|
| H04W 72/51 | (2023.01) |
| H04W 8/18 | (2009.01) |
| H04W 8/22 | (2009.01) |
| H04W 28/02 | (2009.01) |
| H04W 72/0453 | (2023.01) |
| H04W 72/543 | (2023.01) |

(52) U.S. Cl.
CPC ............ *H04W 72/51* (2023.01); *H04W 8/18* (2013.01); *H04W 8/22* (2013.01); *H04W 28/0268* (2013.01); *H04W 72/0453* (2013.01); *H04W 72/543* (2023.01)

(58) Field of Classification Search
CPC ............ H04W 72/51; H04W 72/0453; H04W 72/543; H04W 8/18; H04W 8/22; H04W 28/0268
See application file for complete search history.

(56) References Cited

U.S. PATENT DOCUMENTS

| | | |
|---|---|---|
| 6,373,929 B1 | 4/2002 | Johnson et al. |
| 6,452,915 B1 | 9/2002 | Jorgensen |
| 7,248,871 B2 | 7/2007 | Balon et al. |
| 8,311,557 B2 | 11/2012 | Annamalai |
| 8,751,652 B2 | 6/2014 | Kuure et al. |
| 8,811,175 B2 | 8/2014 | Sharma et al. |
| 8,817,644 B2 | 8/2014 | Etemad |
| 8,929,859 B2 | 1/2015 | Mcnamee et al. |
| 9,020,497 B2 | 4/2015 | Bot et al. |

(Continued)

FOREIGN PATENT DOCUMENTS

| | | |
|---|---|---|
| CN | 101766011 A | 6/2010 |
| EP | 1662831 A1 | 5/2006 |

(Continued)

*Primary Examiner* — Ricardo H Castaneyra
(74) *Attorney, Agent, or Firm* — Perkins Coie LLP

(57) ABSTRACT

Systems and methods for carrier aggregation based on subscriber category information, such as for New Radio Carrier Aggregation in a 5G Network. A call is placed via a calling device and detected at a node of a network. A user equipment capability check is performed, which determines whether the calling device supports carrier aggregation. Subscriber information is received associated with the calling device, including a quality of service (QoS) identifier associated with a subscriber category. Based on the QoS identifier, two or more carriers are selected and assigned. The QoS identifier is associated with a relative priority for assigning cells based on corresponding bandwidth. Call setup is initiated via the two or more carriers.

20 Claims, 4 Drawing Sheets

(56) References Cited

U.S. PATENT DOCUMENTS

| | | | |
|---|---|---|---|
| 9,277,431 B1 | 3/2016 | Podolsky | |
| 9,402,193 B2 | 7/2016 | Sampath et al. | |
| 9,560,669 B2 | 1/2017 | Ludwig et al. | |
| 9,584,337 B2 | 2/2017 | Kadel et al. | |
| 9,585,153 B2 | 2/2017 | Sriram et al. | |
| 9,603,146 B1 * | 3/2017 | Vivanco | H04W 28/0278 |
| 9,763,226 B2 | 9/2017 | Wu et al. | |
| 9,832,671 B2 | 11/2017 | Devarapalli et al. | |
| 9,838,865 B2 | 12/2017 | Park et al. | |
| 9,866,499 B2 | 1/2018 | Lee | |
| 9,973,952 B1 | 5/2018 | Hosseinmostafa et al. | |
| 9,992,695 B2 | 6/2018 | Axmon et al. | |
| 10,084,922 B2 | 9/2018 | Soini et al. | |
| 10,136,446 B2 | 11/2018 | Maheshwari et al. | |
| 10,165,467 B2 | 12/2018 | Papa et al. | |
| 10,212,578 B2 | 2/2019 | Siow et al. | |
| 10,560,918 B1 | 2/2020 | Lau et al. | |
| 10,587,749 B2 | 3/2020 | Drake et al. | |
| 10,595,214 B2 | 3/2020 | Santhanam et al. | |
| 10,595,251 B2 | 3/2020 | Wong et al. | |
| 10,638,449 B2 | 4/2020 | Shan | |
| 10,674,357 B2 | 6/2020 | Syed | |
| 10,708,858 B2 | 7/2020 | Jain et al. | |
| 10,868,763 B2 | 12/2020 | Thanneeru et al. | |
| 10,939,449 B2 | 3/2021 | Srivastava et al. | |
| 11,051,218 B2 | 6/2021 | Balmakhtar et al. | |
| 11,076,436 B2 | 7/2021 | Lu et al. | |
| 11,357,004 B1 * | 6/2022 | Pawar | H04L 5/0098 |
| 2005/0233733 A1 | 10/2005 | Roundtree et al. | |
| 2008/0267114 A1 | 10/2008 | Mukherjee et al. | |
| 2010/0017521 A1 | 1/2010 | Ying et al. | |
| 2011/0014923 A1 | 1/2011 | Krco et al. | |
| 2011/0239273 A1 * | 9/2011 | Yang | H04L 47/521 709/224 |
| 2014/0328228 A1 * | 11/2014 | Park | H04B 7/2656 370/280 |
| 2015/0036489 A1 | 2/2015 | Rajadurai et al. | |
| 2015/0327269 A1 * | 11/2015 | Kim | H04W 72/21 370/329 |
| 2016/0007402 A1 * | 1/2016 | Kim | H04W 76/15 370/252 |
| 2016/0255632 A1 | 9/2016 | Forssell | |
| 2017/0280507 A1 | 9/2017 | Wang | |
| 2019/0150082 A1 | 5/2019 | Kedalagudde et al. | |
| 2020/0275329 A1 | 8/2020 | Damerla et al. | |
| 2021/0014851 A1 | 1/2021 | Liu et al. | |
| 2021/0136870 A1 | 5/2021 | Panchal | |
| 2021/0176634 A1 | 6/2021 | Badar et al. | |
| 2021/0219151 A1 | 7/2021 | Fiorese et al. | |
| 2021/0250831 A1 | 8/2021 | Froehlich et al. | |

FOREIGN PATENT DOCUMENTS

| | | |
|---|---|---|
| JP | 2019527498 A | 9/2019 |
| WO | 9941861 A1 | 8/1999 |
| WO | 2006010335 A1 | 2/2006 |
| WO | 2009040761 A2 | 4/2009 |
| WO | 2017030713 A1 | 2/2017 |
| WO | 2017173158 A1 | 10/2017 |
| WO | 2018083371 A1 | 5/2018 |
| WO | 2021020855 A1 | 2/2021 |
| WO | 2021148192 A1 | 7/2021 |

* cited by examiner

NETWORK-BASED CELL ASSIGNMENT FOR CARRIER AGGREGATION SYSTEMS AND METHODS

BACKGROUND

Carrier aggregation is the process of assigning two or more carriers that are combined into a single data channel, such as contiguous or non-contiguous carriers in a frequency band or inter-band carriers. At least a primary cell (PCell) and a secondary cell (SCell) can be assigned. The PCell serves a corresponding primary component carrier (PCC), and the SCell serves a corresponding secondary component carrier (SCC). Additional carriers can also be assigned. Each carrier can be a signal composed of multiple sub-carriers (e.g., waveform signals of different frequencies) modulated according to various radio technologies. Each modulated signal can be sent on a different sub-carrier and can carry control information (e.g., reference signals, control channels), overhead information, user data, etc.

BRIEF DESCRIPTION OF THE DRAWINGS

Detailed descriptions of implementations of the present invention will be described and explained through the use of the accompanying drawings.

Figure 1:
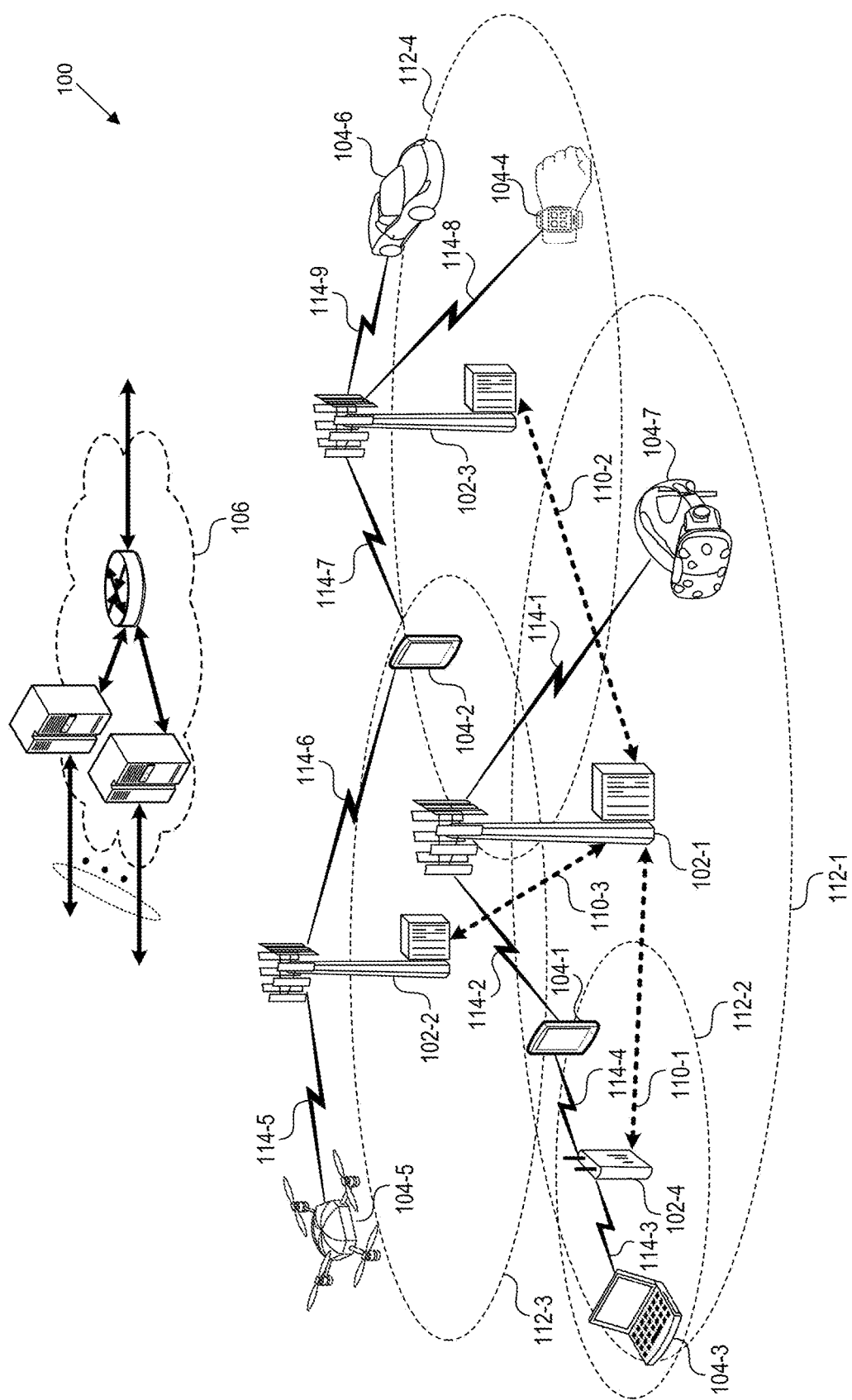
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing technologies for carrier aggregation can result in inefficient or undesirable bandwidth allocations. For example, existing carrier aggregation technologies assign available cells without regard to behaviors or categories of subscribers associated with devices. Thus, a subscriber who misuses network resources (e.g., conducting extensive high-bandwidth activities) is treated the same as a different subscriber who does not misuse network resources, which can cause continued misuse of network resources, inefficient load balancing, poor experiences for subscribers, and other problems. In addition, some subscribers are willing to pay to be a preferred subscriber with priority for allocation of higher-bandwidth cells and/or faster speeds. Other subscribers may want to pay less and receive a lower priority for allocation of cells, for example, because they conduct activities that require little bandwidth, such as simple telematics systems, Internet of Things (IoT) devices, or other connected devices. But existing technologies do not sufficiently allow for differentiation between subscriber categories when carrier aggregation is performed.

Accordingly, there is a need for a solution that overcomes the foregoing technical problems and provides other benefits. For example, there is a need for a technical solution that can perform cell assignment for carrier aggregation with flexible configurations, such as configurations that allow for cell assignment based on various subscriber categories, subscriber behaviors, subscriber plans, and/or other configurable considerations, which can be based on quality of service (QoS) indicators. Additionally, the need for flexible and configurable carrier aggregation will only increase as a greater number of carriers become available, for example, with ongoing implementation of 5G.

Disclosed herein are systems and related methods for assigning cells for carrier aggregation in a telecommunications network ("system" or "cell assignment system"), such as for new radio carrier aggregation (NRCA) in 5G networks. The disclosed system can be provided, for example, by a telecommunications service provider using one or more nodes/servers of a network or networks associated with the service provider, such as a gNodeB or other base station and/or one or more components of a core network. As used herein, a "carrier" or "component carrier" includes at least a portion of a frequency band or block in a wireless network via which uplink and/or downlink connections can be made. A component carrier is based on and/or associated with a corresponding serving cell. Before a call is placed via a calling mobile device, the one or more nodes of the network perform a user equipment (UE) capability check for the calling mobile device. Additionally, the one or more nodes determine a subscriber category associated with the calling mobile device. The subscriber category can be reflected as a quality of service (QoS) identifier, such as 5G QoS Identifier (5QI) or a QoS Class Identifier (QCI), received from a component or function of a core network. The subscriber category can be one of a set of subscriber categories based on, for example, subscriber behaviors (e.g., normal network use, misuse of network resources, high or low data transmission, etc.), subscriber plans (e.g., preferred plans, business subscribers, low-bandwidth subscribers, etc.), and/or other considerations. In response to determining that the calling mobile device supports carrier aggregation, the one or more nodes of the network assign to the calling mobile device at least two carriers, the at least two carriers comprising a first carrier associated with a primary cell (PCell) and a second carrier associated with a secondary cell (SCell). The at least two carriers are assigned based at least in part on the subscriber category. Once the at least two carriers are assigned, the one or more nodes of the network initiate call setup to establish the call.

Advantages of the disclosed technology include improved load balancing and allocation of network resources. Additionally, these and other advantages improve network performance and subscriber experiences. And the disclosed technology allows telecommunication service providers to provide more flexible carrier aggregation options based on subscriber needs and corresponding subscriber plan offerings. Furthermore, the disclosed technology can help reduce control and data channel congestion by allowing for improved allocation of network resources. Additionally, the present technology addresses problems that cannot be solved using existing technologies for load balancing and/or traffic management because existing technologies currently assign carriers without regard to user behaviors, profiles, user applications, categories, or classifications. Overall, the present technology allows operators of telecommunication networks to have control to select different carriers for subscribers based on various flexible parameters. In addition, the disclosed technology for configurable assignment of carriers to provide different services and/or when new spectrum is added to a network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use various frequencies, such as millimeter wave (mmW) access frequencies of 28 GHz or more and/or other bands, such as 24 GHz, 39 GHz, 47 GHz, 60 GHz, and so forth. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The core network 106 includes various components or functions, such as 5G Network Functions, including a Policy Control Function (PCF) or a Policy and Charging Rules Function (PCRF). The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can, thus, form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Carrier Aggregation System

Figure 2:
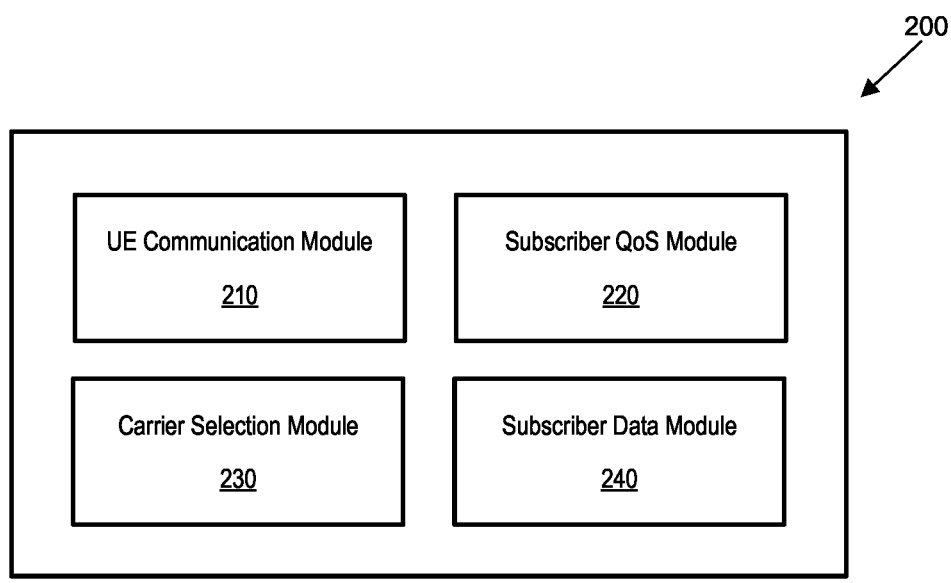
FIG. 2 is a block diagram that illustrates components of a cell assignment system for carrier aggregation in a telecommunications network.

FIG. 2 is a block diagram illustrating components of a carrier aggregation system 200 that assigns cells to devices (e.g., mobile devices or other user equipment (UE)), each cell corresponding to a carrier via which the devices communicate over one or more telecommunications networks. All or portions of the system 200 can be provided, for example, by a telecommunications service provider that provides one or more telecommunications networks, such as the network 100, using one or more components or functions of the core network 106 and/or base stations 102-1 through 102-4, which can comprise any combination of NANs including an access point, radio transceiver, gNodeB (gNB), NodeB, eNodeB (eNB), Home NodeB or Home eNodeB, or the like. For example, at least a portion of the system 200 can reside in a baseband of a base station, such as base stations 102-1 through 102-4, and receive subscriber information from a policy control function (PCF) and/or a policy charging and rules function (PCRF). Additionally or alternatively, at least a portion of the system 200 can reside on one or more UEs, such as wireless devices 104-1 through 104-7. Overall, the system 200 can be implemented in various ways and using various network and/or base station configurations, including, for example, Open Radio Access Network (O-RAN) and/or Virtualized Radio Access Network (vRAN) deployments.

The carrier aggregation system 200 can include functional modules that are implemented with a combination of software (e.g., executable instructions or computer code) and hardware (e.g., one or more memories and one or more processors). Accordingly, as used herein, in some examples a module is a processor-implemented module or set of code, and represents one or more computing devices that are at least temporarily configured and/or programmed by executable instructions carried by one or more memories to perform one or more of the functions described herein. For example, the carrier aggregation system can include a UE communication module 210, a subscriber QoS module 220, a carrier selection module 230, and a subscriber data module 240, which are each discussed below.

UE Communication Module

The UE communication module 210 is configured and/or programmed to perform operations associated with a user equipment (UE) that initiates a communication via a network associated with the system 200. For example, the UE communication module 210 detects that a call or other communication has been placed via a UE associated with a subscriber and performs operations associated with session initiation, setup, and management. The UE communication module 210 also performs and/or receives UE capability checks for UEs. The UE communication module 210 can also manage registration of UEs and/or manage carriers used by UEs. The UE communication module 210 can send, receive, access and/or cause to be sent, various messages, such as Radio Resource Control (RRC) messages. The messages can be, for example, RRC Reconfiguration messages, which can be received by a UE in relation to carrier aggregation operations, connection setup messages, connection complete messages, and so forth.

Subscriber QoS Module

The subscriber QoS module 220 is configured and/or programmed to store/receive/access subscriber information of a subscriber associated with a UE via which communication is initiated. For example, the subscriber QoS module 220 can receive and/or access information from a policy control function (PCF) and/or a policy charging and rules function (PCRF). The information can include, for example, plan information for a subscriber plan of the subscriber. The information also includes subscriber category information that is used by the carrier selection module 230 to select and assign one or more carriers for a UE associated with the subscriber. The subscriber QoS module 220 can also receive and/or access identifying information associated with subscribers and/or UEs, such as an international mobile subscriber identity (IMSI).

The subscriber category information stored/accessed/received by the subscriber QoS module 220 includes one or more subscriber categories associated with a subscriber. The subscriber categories can be based on, for example, one or more plans to which a subscriber subscribes. The one or more plans can be, for example, business or preferred plans, individual or family subscriber plans, economy or prepaid plans, connected device or IoT plans, and so forth. Additionally or alternatively, the subscriber categories can be based on subscriber behaviors or activities, such as a history of misusing network resources, a volume of data transmission in a time period, or an activity category (e.g., calling activity, streaming activity, browsing or application activity, telematics activity, etc.).

In these and other implementations, each of the one or more subscriber categories included in the subscriber category information comprises or is associated with a corresponding QoS identifier reflecting a level of preference or priority for the subscriber. For example, the QoS identifier can be used to differentiate between various levels of user preference or priority for component carriers assigned for carrier aggregation. The QoS identifier can be, for example, a QoS class identifier (QCI) or a 5G QoS identifier (5QI). Examples of subscriber categories and corresponding QoS identifiers are provided in the below Table 1. Although Table 1 describes QCIs, other QoS identifiers can be used, and the provided subscriber categories are non-limiting. Any number of subscriber categories and QoS identifiers can be used, and new subscriber categories and/or QoS identifiers can be created at any time based on, for example, operator-specific categories created for a network or telecommunications service provider, changes in network traffic or subscriber behaviors or activities, short-term or long-term network congestion, one or more load balancing conditions, and so forth.

TABLE 1

| Subscriber Category | QoS Identifier | Description |
| --- | --- | --- |
| Preferred Subscriber | QCI-6 | Subscriber associated with a preferred plan that offers priority for assignment of higher-bandwidth carriers. |
| Ordinary Voice & Data Subscriber | QCI-7 | Subscriber associated with history of an ordinary network activity including voice calls and/or data transmission within a typical range (e.g., assessed in a certain time period, such as daily, weekly, monthly, quarterly, yearly, seasonally, and so on). Prioritized for assignment of medium-to-high bandwidth carriers, except in comparison to QCI-6. |
| Hotspot User | QCI-8 | Subscriber associated with a plan and/or activities using a mobile hotspot to access the internet, transmit data, stream content, etc. Lower priority for assignment of medium-to-high bandwidth carriers, as compared to QCI-6/7, but higher than QCI-9. |
| Heavy Traffic Subscriber/ Misuse of Network Resources | QCI-9 | Subscriber associated with a history of heavy traffic and/or misuse of network resources, such as repeated high-bandwidth activities in a day, a week, a month, etc. Deprioritized for assignment of carriers, such that the subscriber is assigned low bandwidth carriers to avoid congestion. |

Carrier Selection Module

The carrier selection module 230 is configured and/or programmed to select and assign one or more carriers and cells corresponding to the one or more carriers for a UE that initiates a communication via the system 200. Selection and assignment of the one or more carriers is based at least in part on the subscriber category information received/accessed/stored by the subscriber QoS module 220. For example, subscriber categories can be associated with various levels of priority for assignment of carriers and corresponding cells. In some implementations, preferred user categories can be prioritized for assignment of carriers and cells with higher bandwidths, while non-preferred user categories can be assigned to carriers and cells with lower bandwidths. When a UE that initiates a communication is found to support carrier aggregation, the carrier selection module 230 selects and assigns at least two carriers for the UE, including a first carrier associated with a primary cell (PCell) and a second carrier associated with a secondary cell (SCell). In some implementations, the carrier selection module 230 assigns only one carrier and one corresponding cell to a UE, such as when the UE does not support carrier aggregation. In some implementations, the carrier selection module 230 receives and/or accesses the subscriber category information, accesses a data structure, such as a table, that is configurable to specify carrier selection for different subscriber categories, and selects one or more carriers using the data structure and based on the subscriber category information. Carrier selection can be specific to a base station, such as a gNodeB, and subscriber information and/or carrier selection information can be cleared when a call has ended and/or when a handoff is performed to a different base station.

In an example implementation, at least three carriers are available for assignment in response to a communication placed via a calling device. For example, a first time division duplex (TDD) layer of 100 MHz, a second TDD layer of 60 MHz, and a third TDD layer of 40 MHz can be available. If the device is associated with a preferred subscriber category with a relatively high QoS identifier (e.g., QCI-6), then the device is assigned to the first layer and the second layer, with the first layer corresponding to the PCell and the second layer corresponding to the SCell. A device associated with a non-preferred or ordinary subscriber category with a slightly lower QoS identifier (e.g., QCI-8) can be assigned to the second layer and the third layer, with the second layer corresponding to the PCell and the third layer corresponding to the SCell. By contrast, a subscriber category associated with heavy traffic and/or misuse of network resources can be assigned to the second layer and the third layer, with the third layer corresponding to the PCell and the second layer corresponding to the SCell. The foregoing examples are non-limiting, and any number and combination of carriers and associated subscriber categories can be used to assign carriers based on relative preferences associated with QoS identifiers. The foregoing parameters are configurable by a user of the system 200, such as a telecommunication service provider that provides the system 200, and any combination of subscriber categories and corresponding carrier assignments can be used.

Subscriber Data Module

The subscriber data module 240 is configured and/or programmed to receive/access/store information about subscribers and/or their associated UE. For example, the subscriber data module 240 can store or access information about behaviors or activities associated with subscribers, which can be used to assign or reassign subscribers to different subscriber categories and/or corresponding QoS identifiers. In some implementations, subscriber data is maintained by or in a core network, such as in a subscriber profile, which can be used to assign a subscriber category and/or a QoS identifier.

Carrier Selection and Assignment

Figure 3:
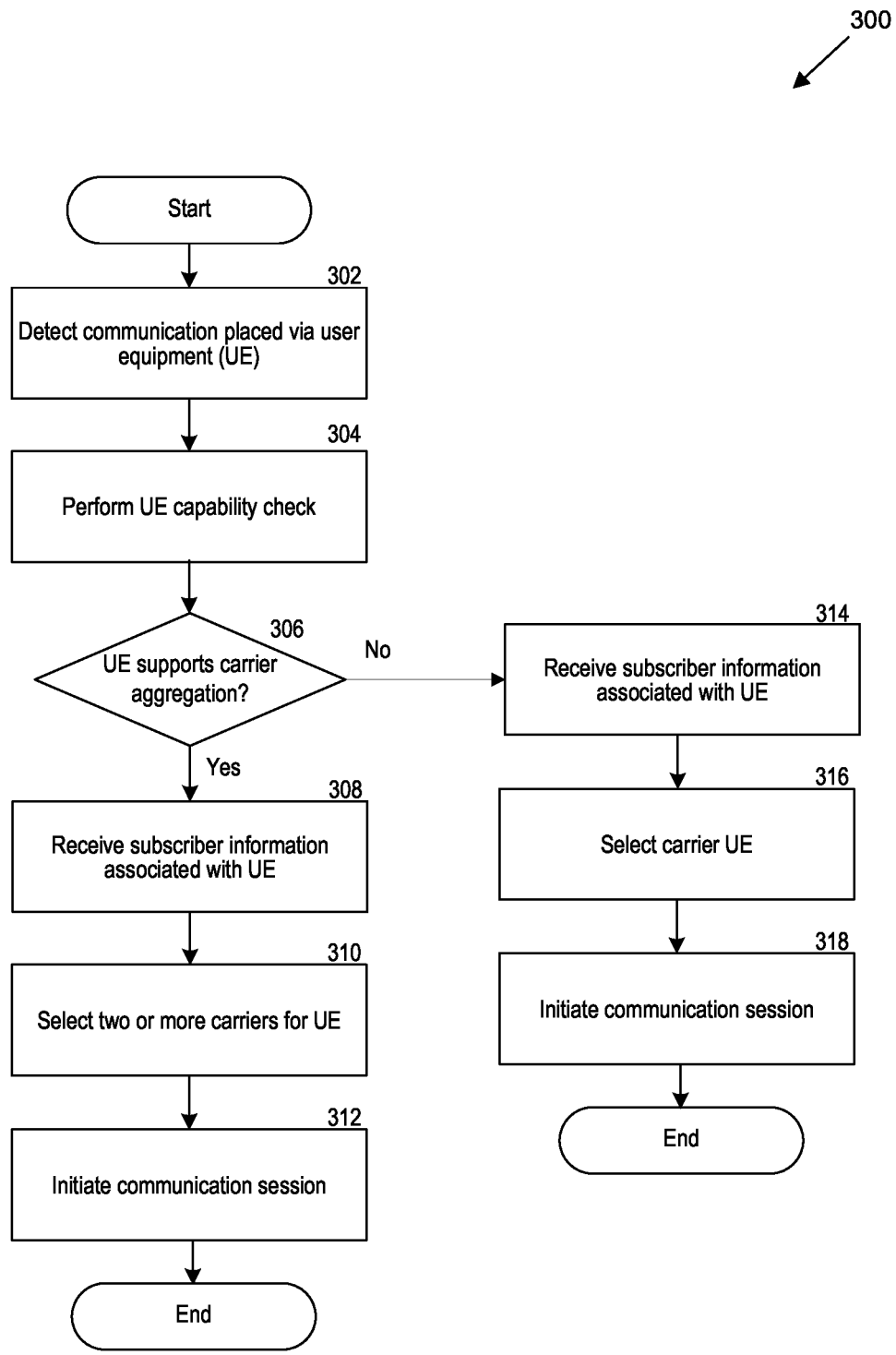
FIG. 3 is a flow diagram that illustrates a cell assignment process for carrier aggregation in a telecommunications network.

FIG. 3 is a flow diagram that illustrates a process 300 for selecting and assigning one or more carriers and corresponding cells via which a UE communicates over a network. In general, the process 300 assigns the one or more carriers and corresponding cells based on a subscriber category and an associated QoS identifier for a subscriber associated with a UE that initiates a communication.

The process 300 begins at block 302, where a communication is detected. For example, a base station of a telecommunications network can detect that a UE, such as a mobile device, is initiating a call or other communication. The base station can be, for example, a gNodeB, and the communication can be a voice or video call, a transmission of data, a message, or another kind of communication.

The process 304 then proceeds to block 304, where a capability check is performed for the UE that initiates the communication. For example, the base station can send a UE capability check message to the UE, and the UE can reply to the message with UE capability information that includes an indication of a number of carriers supported by the UE.

The process 300 then proceeds to decision block 306, where the system determines whether the UE supports carrier aggregation. For example, the base station can access the UE capability information received at block 304, which indication of whether the UE supports carrier aggregation and/or additional UE capability information, such as supported bands/bandwidths, number of layers/carriers supported, and so forth.

If the UE supports carrier aggregation, then the process 300 proceeds to block 308 where subscriber information associated with the UE is received. For example, at step 308 a gNodeB that performs at least a portion of the process 300 can access or receive information from a PCF or PCRF of a core network. The subscriber information includes one or more subscriber categories associated with the UE and/or a QoS identifier corresponding to the one or more subscriber categories. In some implementations, the subscriber information can also include one or more of a Radio Access Technology (RAT) Frequency Selection Policy (RFSP), an Allocation and Retention Priority (ARP), and/or Single-Network Slice Selection Assistance information. As described herein, the QoS identifier and/or the additional subscriber information specifies a level of preference or priority for selection and assignment of one or more carriers and corresponding cells for the UE. In some implementations, the base station receives the QoS identifier, such as from a PCF or PCRF, and determines the subscriber category and/or the level of preference or priority based on the QoS identifier. For example, the subscriber category and/or level of preference or priority can be stored and/or accessed locally at the base station and associated with a corresponding QoS identifier, alone or in combination with other subscriber information.

The process 300 then proceeds to block 310, where two or more carriers are selected for the UE. The selection of the two or more carriers is based, at least in part, on the QoS identifier for the UE and/or the other subscriber information received/accessed at block 308. For example, a data structure, such as a table, can be accessed, which is configurable to specify carrier selection for different subscriber categories, and the carriers can be selected using the data structure and based on the QoS identifier and/or the other subscriber information.

The process 300 then proceeds to block 312, where a communication session is initiated for the communication placed via the UE. Initiating the communication session can include, for example, generating a release message that causes setup of the communication session via the two or more carriers selected at block 310.

If, at block 306, the UE is found not to support carrier aggregation, then the process 300 proceeds to block 314, where subscriber information is received associated with the UE, as in block 308.

The process 300 then proceeds to block 316, where a single carrier is selected for the UE. The selection of the carrier is based, at least in part, on the QoS identifier for the UE.

The process 300 then proceeds to block 318, where a communication session is initiated for the communication placed via the UE. Initiating the communication session can include, for example, generating a release message that causes setup of the communication session via the carrier selected at block 316.

All or portions of process 300 can be performed in any order, including performing one or more operations in parallel. Additionally, operations can be added to or omitted from process 300 without deviating from the teachings of the present disclosure.

Computing System

Figure 4:
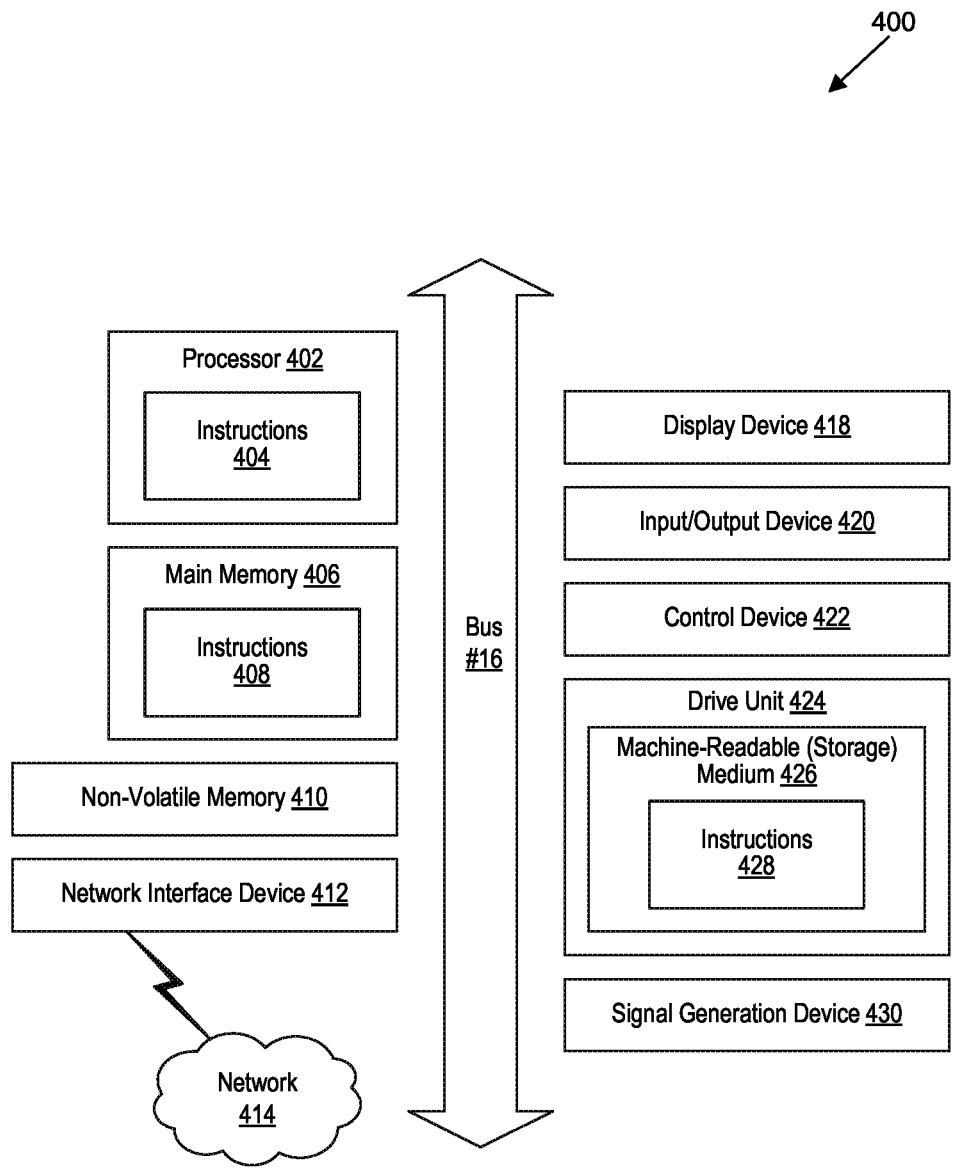
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computing system 400 can be an embedded computer system, a system-on-chip (SOC), a single-board computer system (SBC) or a distributed system such as a mesh of computer systems or include one or more cloud components in one or more networks. Where appropriate, one or more computing systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computing system for performing carrier aggregation in a telecommunications network based on subscriber category information, the computing system comprising:
at least one hardware processor; and
at least one memory carrying instructions configured to cause the computing system to perform operations comprising:
detecting a communication from a user equipment (UE);
receiving, from the UE and in response to a request for UE capability information, the UE capability information,
wherein the UE capability information includes an indication that the UE supports carrier aggregation;
accessing subscriber information associated with the UE,
wherein the subscriber information includes a quality of service (QOS) identifier, and
wherein the QoS identifier is associated with a subscriber category for the UE based on a subscriber plan and a pattern of activity associated with the UE,
wherein the pattern of the activity includes one or more of:
1) network use satisfying network constraints related to at least one of: frequency or bandwidth, or
2) the network use failing to satisfy the network constraints;
selecting, based at least in part on the QoS identifier, at least two carriers for the UE,
wherein the at least two carriers include a first carrier associated with a primary cell (PCell) and a second carrier associated with a secondary cell (SCell); and
initiating, in response to the communication from the UE and via the at least two carriers for the UE, a communication session.

2. The computing system of claim 1 wherein the computing system comprises at least a portion of a base station of the telecommunications network, and wherein the base station further comprises at least one transceiver.

3. The computing system of claim 1, wherein the subscriber category includes a preferred subscriber category, a non-preferred subscriber category, a heavy user category, a default subscriber category, a hotspot user category, an operator-specific subscriber category, or any combination thereof.

4. The computing system of claim 1:
wherein the QoS identifier is a QoS Class Identifier (QCI) or a 5G QoS Identifier (5QI), and
wherein accessing the subscriber information associated with the UE includes receiving at least a portion of the subscriber information from a Policy Control Function (PCF) of a core network.

5. The computing system of claim 1, wherein selecting the at least two carriers for the UE includes selecting the PCell based on a highest available bandwidth.

6. The computing system of claim 1, wherein the subscriber information includes one or more charging policies associated with the UE.

7. A non-transitory computer-readable medium carrying instructions that, when executed by a computing system, cause the computing system to perform operations for assigning carriers in a telecommunications network based on subscriber category information associated with a device, the operations comprising:
in response to a call placed via a calling mobile device, performing a user equipment (UE) capability check;
accessing subscriber information associated with the calling mobile device,
wherein the subscriber information includes a quality of service (Qos) identifier associated with a subscriber category, and
wherein the subscriber category is based on a subscriber plan and a pattern of activity, or both, associated with the calling mobile device,
wherein the pattern of the activity includes one or more of:
1) network use satisfying network constraints related to at least one of: frequency or bandwidth, or
2) The network use failing to satisfy the network constraints;
based on the UE capability check, determining that the calling mobile device supports carrier aggregation;
selecting, based at least in part on the QoS identifier, at least two carriers for the calling mobile device,
wherein the at least two carriers include a first carrier associated with a primary cell (PCell) and a second carrier associated with a secondary cell (SCell); and
initiating call setup for the call placed via the calling mobile device via the at least two carriers.

8. The non-transitory computer-readable medium of claim 7, wherein at least one node of the telecommunications network includes a gNodeB, and wherein accessing the subscriber information associated with the calling mobile device includes receiving at least a portion of the subscriber information from a Policy Control Function (PCF) of a core network.

9. The non-transitory computer-readable medium of claim 7, wherein the subscriber category includes a preferred subscriber category, a non-preferred subscriber category, a heavy user category, a default subscriber category, a hotspot user category, an operator-specific subscriber category, or any combination thereof.

10. The non-transitory computer-readable medium of claim 7, wherein the QoS identifier is a QoS Class Identifier (QCI) or a 5G QoS Identifier (5QI).

11. The non-transitory computer-readable medium of claim 7, wherein selecting the at least two carriers for the calling mobile device includes:
selecting the PCell based on a highest available bandwidth; and
causing a Radio Resource Control (RRC) reconfiguration message to be sent to the calling mobile device.

12. The non-transitory computer-readable medium of claim 7, wherein the subscriber information includes one or more charging policies associated with the calling mobile device.

13. The non-transitory computer-readable medium of claim 7, wherein initiating the call setup for the call placed via the calling mobile device via the at least two carriers includes transmitting a release message that causes the call to be placed via the at least two carriers.

14. The non-transitory computer-readable medium of claim 7, wherein initiating the call setup includes transmitting, by a base station, a release message that causes the call setup to be initiated via the at least two carriers.

15. A non-transitory computer-readable medium carrying instructions that, when executed by at least one computing system, cause the at least one computing system to perform operations for performing carrier aggregation in a telecommunications network based on subscriber category information, the operations comprising:
   detecting a communication from a user equipment (UE);
   receiving, from the UE and in response to a request for UE capability information, the UE capability information, wherein the UE capability information includes an indication that the UE supports carrier aggregation;
   accessing subscriber information associated with the UE, wherein the subscriber information includes a quality of service (QOS) identifier, and
      wherein the QoS identifier is associated with a subscriber category for the UE based on a subscriber plan and a pattern of activity associated with the UE, wherein the pattern of the activity includes one or more of:
         1) network use satisfying network constraints related to at least one of: frequency or bandwidth, or
         2) the network use failing to satisfy the network constraints;
   selecting, based at least in part on the QoS identifier, at least two carriers for the UE,
      wherein the at least two carriers include a first carrier associated with a primary cell (PCell) and a second carrier associated with a secondary cell (SCell); and
   initiating, in response to the communication from the UE and via the at least two carriers for the UE, a communication session.

16. The non-transitory computer-readable medium of claim 15, wherein the computing system comprises at least a portion of a gNodeB, and wherein accessing the subscriber information associated with the UE includes receiving at least a portion of the subscriber information from a Policy Control Function (PCF) of a core network.

17. The non-transitory computer-readable medium of claim 15, wherein the subscriber category includes a preferred subscriber category, a non-preferred subscriber category, a heavy user category, a default subscriber category, a hotspot user category, an operator-specific subscriber category, or any combination thereof.

18. The computer-readable medium of claim 15, wherein the QoS identifier is a QoS Class Identifier (QCI) or a 5G QoS Identifier (5QI).

19. The computer-readable medium of claim 15, wherein selecting the at least two carriers for the UE includes selecting the PCell based on a highest available bandwidth.

20. The computer-readable medium of claim 15, wherein initiating the communication session includes transmitting a release message that causes the communication to be established via the at least two carriers.

* * * * *